United States Patent
Gupta et al.

(10) Patent No.: US 12,417,205 B2
(45) Date of Patent: Sep. 16, 2025

(54) TECHNIQUE FOR EFFICIENTLY INDEXING DATA OF AN ARCHIVAL STORAGE SYSTEM

(71) Applicant: Nutanix, Inc., San Jose, CA (US)

(72) Inventors: Abhishek Gupta, Ghaziabad (IN); Andrey Alexseyevich Pyatkov, Seattle, WA (US); Angshuman Bezbaruah, Redmond, WA (US); Artem Yevgenyevich Livshits, Bellevue, WA (US); Brajesh Kumar Shrivastava, Bengaluru (IN); Karan Gupta, San Jose, CA (US); Prakash Narayanasamy, Saratoga, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/487,935

(22) Filed: Sep. 28, 2021

(65) Prior Publication Data

US 2023/0029677 A1    Feb. 2, 2023

(30) Foreign Application Priority Data

Jul. 29, 2021    (IN) .............................. 202141034114

(51) Int. Cl.
*G06F 16/11* (2019.01)
*G06F 16/13* (2019.01)

(52) U.S. Cl.
CPC .......... *G06F 16/113* (2019.01); *G06F 16/128* (2019.01); *G06F 16/134* (2019.01)

(58) Field of Classification Search
None
See application file for complete search history.

(56) References Cited

U.S. PATENT DOCUMENTS

| 7,725,671 B2 | 5/2010 | Prahlad et al. |
| 7,840,533 B2 | 11/2010 | Prahlad et al. |

(Continued)

FOREIGN PATENT DOCUMENTS

| AU | 2018324425 B2 | 3/2019 |
| EP | 2863310 A1 | 4/2015 |

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Neveen Abel Jalil
*Assistant Examiner* — John J Morris
(74) *Attorney, Agent, or Firm* — Cesari and McKenna, LLP

(57) ABSTRACT

An indexing technique provides an index data structure for efficient retrieval of a snapshot from a long-term storage service (LTSS) of an archival storage system. The snapshot is generated from typed data of a logical entity, such as a virtual disk (vdisk). The data of the snapshot is replicated to a frontend data service of the LTSS sequentially and organized as one or more data objects for storage by a backend data service of LTSS in an object store of the archival storage system. Metadata associated with the snapshot (i.e., snapshot metadata) is recorded as a log and persistently stored on storage media local to the frontend data service. The snapshot metadata includes information describing the snapshot data, e.g., a logical offset range of a snapshot of the vdisk and, thus, is used to construct the index data structure. Notably, construction of the index data structure is deferred until after the entirety of the snapshot data has been replicated and received by the frontend data service.

27 Claims, 8 Drawing Sheets

(56) References Cited

U.S. PATENT DOCUMENTS

| | | | |
|---|---|---|---|
| 8,447,728 | B2 | 5/2013 | Prahlad et al. |
| 8,549,518 | B1 | 10/2013 | Aron et al. |
| 8,601,473 | B1 | 12/2013 | Aron et al. |
| 8,762,335 | B2 | 6/2014 | Prahlad et al. |
| 8,850,130 | B1 | 9/2014 | Aron et al. |
| 8,863,124 | B1 | 10/2014 | Aron et al. |
| 9,009,106 | B1 | 4/2015 | Aron et al. |
| 9,047,312 | B1 | 6/2015 | Ten-Pow |
| 9,069,708 | B2 | 6/2015 | Gill et al. |
| 9,336,132 | B1 | 5/2016 | Aron et al. |
| 9,652,265 | B1 | 5/2017 | Narayanasamy et al. |
| 9,740,723 | B2 | 8/2017 | Prahlad et al. |
| 9,747,287 | B1 | 8/2017 | Bhardwaj et al. |
| 9,772,866 | B1 | 9/2017 | Aron et al. |
| 10,210,048 | B2 | 2/2019 | Sancheti |
| 10,248,657 | B2 | 4/2019 | Prahlad et al. |
| 10,831,608 | B2 | 11/2020 | Prahlad et al. |
| 10,922,132 | B1 | 2/2021 | Shiramshetti |
| 2006/0265713 | A1 | 11/2006 | Depro |
| 2008/0244205 | A1 | 10/2008 | Amano |
| 2014/0006357 | A1 | 1/2014 | Davis |
| 2015/0066857 | A1* | 3/2015 | Dayal .................. G06F 16/128 707/639 |
| 2015/0178167 | A1 | 6/2015 | Kulkarni |
| 2016/0210306 | A1* | 7/2016 | Kumarasamy ........ G06F 16/178 |
| 2016/0224429 | A1* | 8/2016 | Prahlad ............... G06F 9/45558 |
| 2017/0351434 | A1 | 12/2017 | Nakajima |
| 2018/0276224 | A1 | 9/2018 | Natanzon |
| 2018/0332121 | A1 | 11/2018 | Burba |
| 2019/0004735 | A1 | 1/2019 | Spillane |
| 2019/0065322 | A1* | 2/2019 | Chakankar .............. G06F 16/27 |
| 2019/0073378 | A1 | 3/2019 | Guturi |
| 2019/0179918 | A1 | 6/2019 | Singh |
| 2019/0213123 | A1 | 7/2019 | Agarwal |
| 2019/0213267 | A1* | 7/2019 | Agarwal ............. G06F 11/1458 |
| 2019/0332268 | A1 | 10/2019 | Greenwood |
| 2019/0384678 | A1 | 12/2019 | Samprathi et al. |
| 2020/0026687 | A1* | 1/2020 | Ben Dayan ........... G06F 16/182 |
| 2020/0233835 | A1 | 7/2020 | Guturi et al. |
| 2020/0285410 | A1* | 9/2020 | George ................. G06F 3/0644 |
| 2021/0103555 | A1* | 4/2021 | Kaplingat ........... G06F 11/1461 |
| 2022/0261386 | A1* | 8/2022 | Negi ................... G06F 16/2343 |
| 2022/0309010 | A1 | 9/2022 | Jiang et al. |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven "The Nutanix Bible" from https://nutanixbible.com/, Sep. 17, 2019.

Citrix XenDesktop 7.1 on Microsoft Hyper-V Server 2012 R2 on Nutanix Virtual Computing Platform Solution Design Citrix Validated Solutions, Jun. 25, 2014, 95 pages.

European Search Report, Application No. EP 22 18 7472, dated Nov. 28, 2022, 8 pages.

* cited by examiner

TECHNIQUE FOR EFFICIENTLY INDEXING DATA OF AN ARCHIVAL STORAGE SYSTEM

CROSS-REFERENCE TO RELATED APPLICATIONS

The present application claims the benefit of India Provisional Patent Application Serial No. 202141034114, which was filed on Jul. 29, 2021, by Abhishek Gupta, et al. for TECHNIQUE FOR EFFICIENTLY INDEXING DATA OF AN ARCHIVAL STORAGE SYSTEM, which is hereby incorporated by reference.

BACKGROUND

Technical Field

The present disclosure relates to archival of data and, more specifically, to efficient indexing of snapshot data in an archival storage system.

Background Information

File systems are primarily configured to process (i.e., store and retrieve) active input/output (I/O) data streams issued by, e.g., a user application executing in a virtual machine of a storage system. Such file systems are not generally configured to maintain large quantities of snapshots for long-term storage and retention in an archival storage system because they are primarily designed for rapid application of changes (e.g., as "live" data) to support immediate access requests. Accordingly, backup/archival storage systems associated with active file systems usually require that snapshot data be immediately available for retrieval, e.g., to support critical restore operations. That is, conventional file systems and their associated backup/archival systems are typically designed for immediate on-demand data availability. As a result, these systems generally process data indexing/location information together with storage layout and data storage so that recently stored data may be immediately retrieved. Further, retrieval time for the data generally increases as the number of snapshots increases because of the need to traverse a greater amount of metadata usually needed to support "live access" to recent data.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
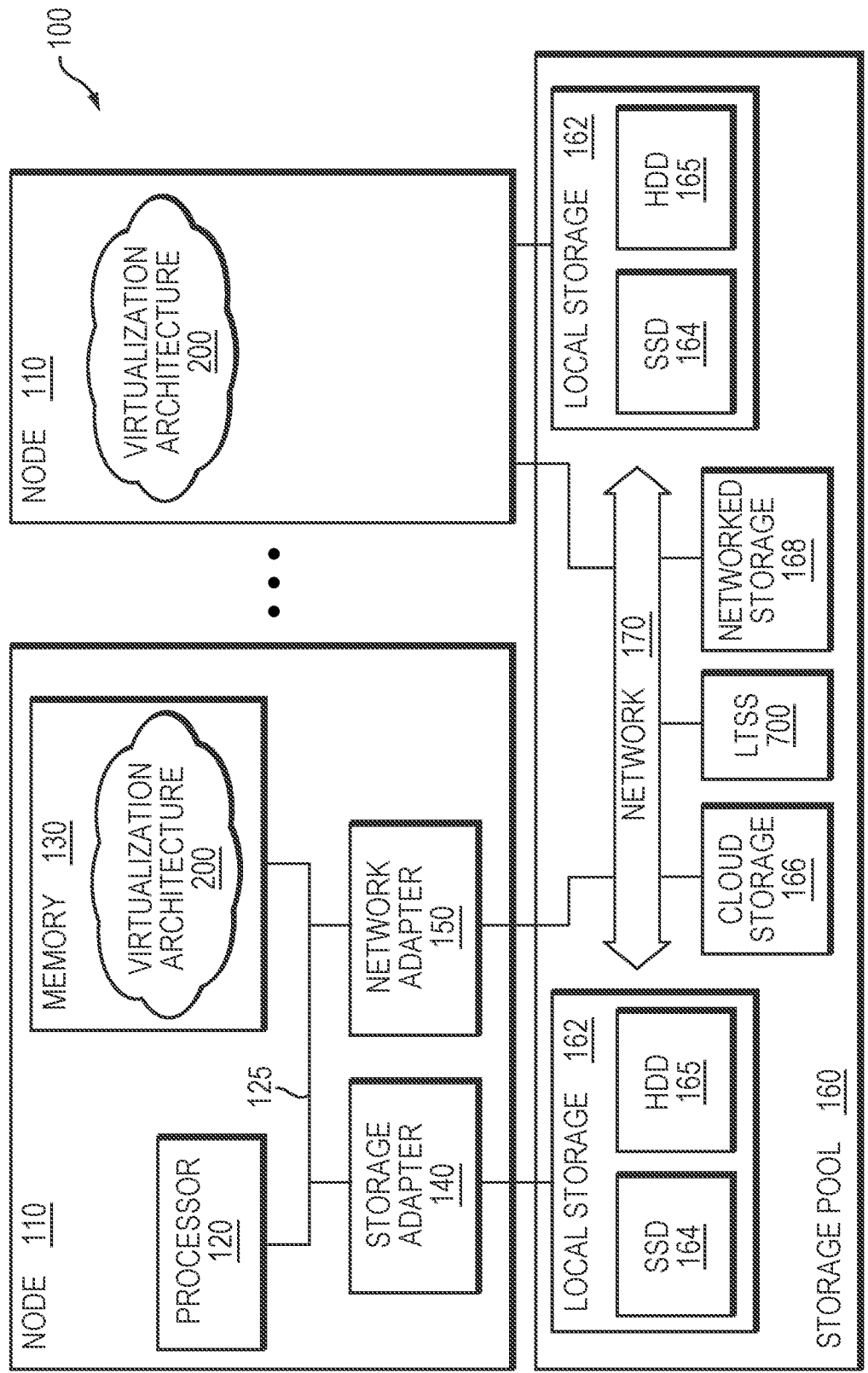
FIG. 1 is a block diagram of a plurality of nodes interconnected as a cluster in a virtualized environment.

The embodiments described herein are directed to an indexing technique configured to provide an index data structure for efficient retrieval of data from one of a substantial number (e.g., many thousand over a period of years) of point-in-time images (e.g., snapshots) maintained in a long-term storage service (LTSS) of an archival storage system. The index data structure identifies the data for retrieval across the large number of snapshots independent of the number of snapshots (i.e., constant retrieval time). The snapshots may be generated by a client (e.g., a distributed file system of a storage system) from type-identified data of a logical entity, e.g., a storage object, such as a virtual disk (vdisk) exported to a virtual machine (VM) of the storage system. Indexing of the index data structure is configured according to extents of the vdisk defined herein as contiguous, non-overlapping, variable-length regions of the vdisk generally sized for convenience of object stores in archival storage systems (e.g., Amazon AWS S3 storage services, Google Cloud Storage, Microsoft Azure Blob Storage, and the like). Effectively, the index data structure acts as an independent database organized to retrieve data by extent of a vdisk (as recorded in the associated object store of the archival storage system) according to any point-in-time image and spans a large (e.g., petabytes of) address space to support a substantial (e.g., massive) number of data changes over a very large number of snapshots for many years.

According to the indexing technique, each snapshot is associated with a corresponding index data structure and may include incremental changes to a prior snapshot that may reference a prior index data structure associated with the prior snapshot. As a result, only changes between snapshots need be stored in the archival storage system as later index data structures may reference (via prior index data structures) older blocks in prior snapshots. In addition, the organization and metadata of each snapshot replicated to the object store remains intact (i.e., undisturbed). Accordingly, the indexing technique is independent of internal snapshot organization and number of snapshots, as well as agnostic to the archival storage system to thereby enable support of object stores in different (i.e., heterogeneous) archival storage systems simultaneously.

In one or more embodiments, the data of the snapshot(s) is replicated from the client to a frontend data service of the LTSS sequentially (e.g., in a log-structured format) and organized as one or more data objects for storage by a backend data service of LTSS in an object store of the archival storage system. Metadata associated with the snapshot (i.e., snapshot metadata organizing and describing the data) is recorded as a log and persistently stored on storage media local to the frontend data service. The snapshot metadata includes information describing the snapshot data, e.g., a logical offset and range of an extent in a snapshot of the vdisk as well as an object identifier containing that extent and the logical offset within the object where the data extent resides and, thus, is used to construct the index data structure. Notably, construction of the index data structure is deferred until after the entirety of the snapshot data has been replicated, received and organized by the frontend data service for storage on the object store. That is, unlike conventional file systems that usually perform indexing of data in combination with storing that data ostensibly to support contemporaneous data storage and retrieval requests typical of an active file system, the indexing technique herein is not performed until after the data (i.e., all snapshot data) being indexed is already written to the object store, which is treated instead as an immutable archive due to the read-only property of snapshots. This enables index construction to be performed on immutable data, which can be deferred until all the data has been written to the object store.

In one or more embodiments, the index data structure is a B+ tree with a large branching factor that is configured to translate a logical offset range (address space) of data in a snapshot to a data object address space of the object store hosting (storing) the snapshot data by extent to thereby enable efficient (i.e., bounded time) retrieval of the snapshot data from the object store independent of the number of snapshots. Deferral of construction of the index data structure enables fast intake (i.e., streaming reception) of the snapshot data in a log-structured (e.g., sequential order) format while the snapshot metadata is recorded in the persistent log by the frontend data service. Therefore, the technique also provides an efficient indexing arrangement that leverages a "write-heavy" feature of the log-structured format to increase write throughput to the LTSS for snapshot data replication to the object store with a "read-heavy" feature of the index (B+ tree) data structure to improve read latency (i.e., bounded time to locate data independent of the number of snapshots) by the LTSS for snapshot data retrieval from the object store.

DESCRIPTION

FIG. 1 is a block diagram of a plurality of nodes 110 interconnected as a cluster 100 and configured to provide compute and storage services for information, data and metadata, stored on storage devices of a virtualization environment. Each node 110 is illustratively embodied as a physical computer having hardware resources, such as one or more processors 120, main memory 130, one or more storage adapters 140, and one or more network adapters 150 coupled by an interconnect, such as a system bus 125. The storage adapter 140 may be configured to access information stored on storage devices, such as solid state drives (SSDs) 164 and magnetic hard disk drives (HDDs) 165, which are organized as local storage 162 and virtualized within multiple tiers of storage as a unified storage pool 160, referred to as scale-out converged storage (SOCS) accessible cluster-wide. To that end, the storage adapter 140 may include input/output (I/O) interface circuitry that couples to the storage devices over an I/O interconnect arrangement, such as a conventional peripheral component interconnect (PCI) or serial ATA (SATA) topology.

The network adapter 150 connects the node 110 to other nodes 110 of the cluster 100 over network 170, which is illustratively an Ethernet local area network (LAN). The network adapter 150 may thus be embodied as a network interface card having the mechanical, electrical and signaling circuitry needed to connect the node 110 to the network 170. The multiple tiers of SOCS include storage that is accessible through the network 170, such as cloud storage 166 and/or networked storage 168, as well as the local storage 162 within or directly attached to the node 110 and managed as part of the storage pool 160 of storage objects, such as files and/or logical units (LUNs). The cloud and/or networked storage may be embodied as network attached storage (NAS) or storage area network (SAN) and include combinations of storage devices (e.g., SSDs and/or HDDs) from the storage pool 160. As described herein, a long-term storage service (LTSS 700) of an archival storage system provides storage of large numbers (amounts) of point-in-time images or recovery points (i.e., snapshots) of application workloads on an object store. Communication over the network 170 may be effected by exchanging discrete frames or packets of data according to protocols, such as the Transmission Control Protocol/Internet Protocol (TCP/IP) and the OpenID Connect (OIDC) protocol, although other protocols, such as the User Datagram Protocol (UDP) and the HyperText Transfer Protocol Secure (HTTPS), as well as specialized application program interfaces (APIs) may also be advantageously employed.

The main memory 120 includes a plurality of memory locations addressable by the processor 120 and/or adapters for storing software code (e.g., processes and/or services) and data structures associated with the embodiments described herein. The processor and adapters may, in turn, include processing elements and/or circuitry configured to execute the software code, such as virtualization software of virtualization architecture 200, and manipulate the data structures. As described herein, the virtualization architecture 200 enables each node 110 to execute (run) one or more virtual machines that write data to the unified storage pool 160 as if they were writing to a SAN. The virtualization environment provided by the virtualization architecture 200 relocates data closer to the virtual machines consuming the data by storing the data locally on the local storage 162 of the cluster 100 (if desired), resulting in higher performance at a lower cost. The virtualization environment can horizontally scale from a few nodes 110 to a large number of nodes, enabling organizations to scale their infrastructure as their needs grow.

It will be apparent to those skilled in the art that other types of processing elements and memory, including various computer-readable media, may be used to store and execute program instructions pertaining to the embodiments described herein. Also, while the embodiments herein are described in terms of software code, processes, and computer (e.g., application) programs stored in memory, alternative embodiments also include the code, processes and programs being embodied as logic, components, and/or modules consisting of hardware, software, firmware, or combinations thereof.

Figure 2:
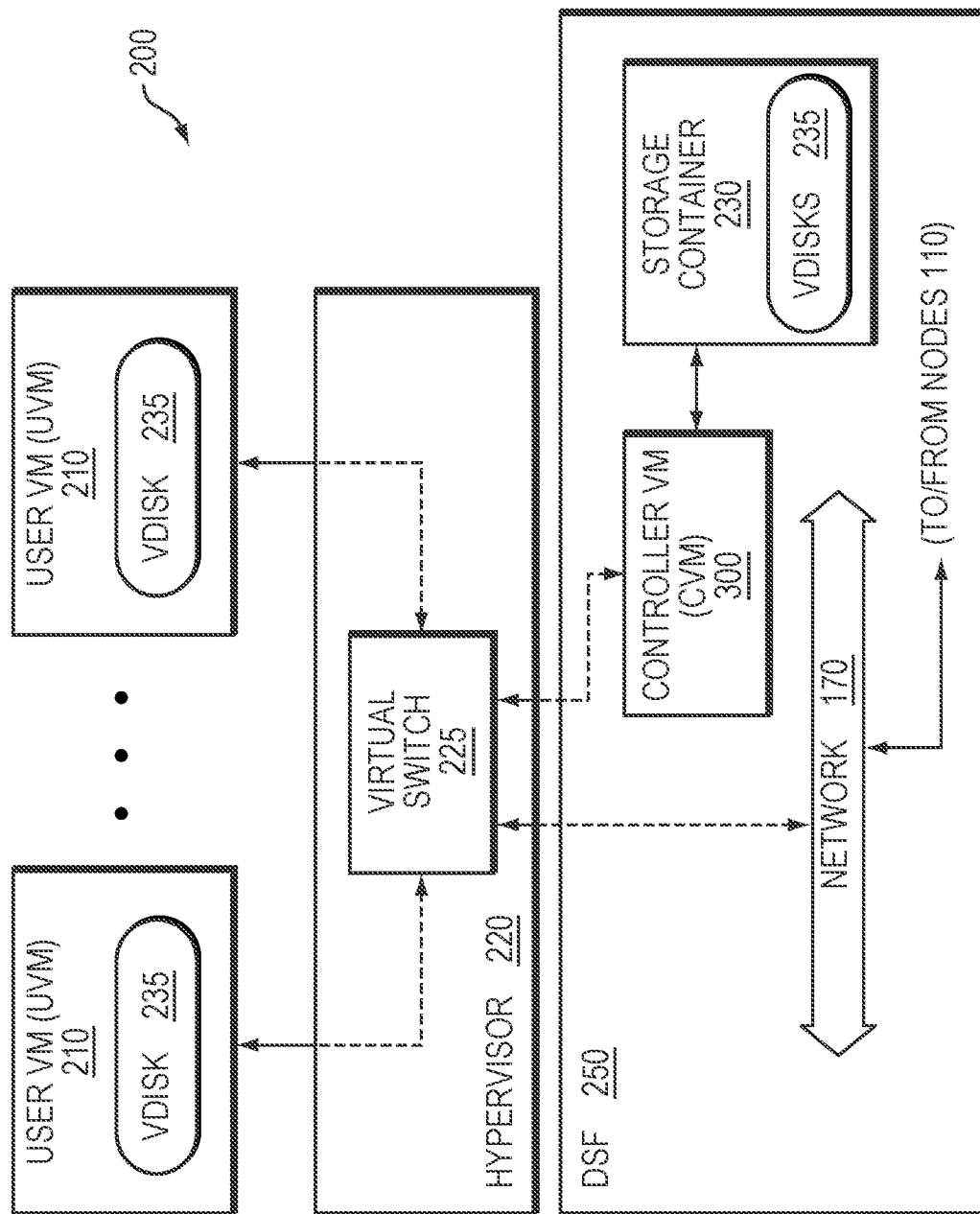
FIG. 2 is a block diagram of a virtualization architecture executing on a node to implement the virtualization environment.

FIG. 2 is a block diagram of a virtualization architecture 200 executing on a node to implement the virtualization environment. Each node 110 of the cluster 100 includes software components that interact and cooperate with the hardware resources to implement virtualization. The software components include a hypervisor 220, which is a virtualization platform configured to mask low-level hardware operations from one or more guest operating systems executing in one or more user virtual machines (UVMs) 210 that run client software. The hypervisor 220 allocates the hardware resources dynamically and transparently to manage interactions between the underlying hardware and the UVMs 210. In an embodiment, the hypervisor 220 is illustratively the Nutanix Acropolis Hypervisor (AHV), although other types of hypervisors, such as the Xen hypervisor, Microsoft's Hyper-V, RedHat's KVM, and/or VMware's ESXi, may be used in accordance with the embodiments described herein.

Another software component running on each node 110 is a special virtual machine, called a controller virtual machine (CVM) 300, which functions as a virtual controller for SOCS. The CVMs 300 on the nodes 110 of the cluster 100 interact and cooperate to form a distributed system that manages all storage resources in the cluster. Illustratively, the CVMs and storage resources that they manage provide an abstraction of a distributed storage fabric (DSF) 250 that scales with the number of nodes 110 in the cluster 100 to provide cluster-wide distributed storage of data and access to the storage resources with data redundancy across the cluster. That is, unlike traditional NAS/SAN solutions that are limited to a small number of fixed controllers, the virtualization architecture 200 continues to scale as more nodes are added with data distributed across the storage resources of the cluster. As such, the cluster operates as a hyperconvergence architecture wherein the nodes provide both storage and computational resources available cluster-wide.

The client software (e.g., applications) running in the UVMs 210 may access the DSF 250 using filesystem protocols, such as the network file system (NFS) protocol, the common internet file system (CIFS) protocol and the internet small computer system interface (iSCSI) protocol. Operations on these filesystem protocols are interposed at the hypervisor 220 and redirected (via virtual switch 225) to the CVM 300, which exports one or more iSCSI, CIFS, or NFS targets organized from the storage objects in the storage pool 160 of DSF 250 to appear as disks to the UVMs 210. These targets are virtualized, e.g., by software running on the CVMs, and exported as virtual disks (vdisks) 235 to the UVMs 210. In some embodiments, the vdisk is exposed via iSCSI, CIFS or NFS and is mounted as a virtual disk on the UVM 210. User data (including the guest operating systems) in the UVMs 210 reside on the vdisks 235 and operations on the vdisks are mapped to physical storage devices (SSDs and/or HDDs) located in DSF 250 of the cluster 100.

In an embodiment, the virtual switch 225 may be employed to enable I/O accesses from a UVM 210 to a storage device via a CVM 300 on the same or different node 110. The UVM 210 may issue the I/O accesses as a SCSI protocol request to the storage device. Illustratively, the hypervisor 220 intercepts the SCSI request and converts it to an iSCSI, CIFS, or NFS request as part of its hardware emulation layer. As previously noted, a virtual SCSI disk attached to the UVM 210 may be embodied as either an iSCSI LUN or a file served by an NFS or CIFS server. An iSCSI initiator, SMB/CIFS or NFS client software may be employed to convert the SCSI-formatted UVM request into an appropriate iSCSI, CIFS or NFS formatted request that can be processed by the CVM 300. As used herein, the terms iSCSI, CIFS and NFS may be interchangeably used to refer to an IP-based storage protocol used to communicate between the hypervisor 220 and the CVM 30). This approach obviates the need to individually reconfigure the software executing in the UVMs to directly operate with the IP-based storage protocol as the IP-based storage is transparently provided to the UVM.

For example, the IP-based storage protocol request may designate an IP address of a CVM 300 from which the UVM 210 desires I/O services. The IP-based storage protocol request may be sent from the UVM 210 to the virtual switch 225 within the hypervisor 220 configured to forward the request to a destination for servicing the request. If the request is intended to be processed by the CVM 300 within the same node as the UVM 210, then the IP-based storage protocol request is internally forwarded within the node to the CVM. The CVM 300 is configured and structured to properly interpret and process that request. Notably, the IP-based storage protocol request packets may remain in the node 110 when the communication—the request and the response—begins and ends within the hypervisor 220. In other embodiments, the IP-based storage protocol request may be routed by the virtual switch 225 to a CVM 300 on another node of the cluster 100 for processing. Specifically, the IP-based storage protocol request is forwarded by the virtual switch 225 to a physical switch (not shown) for transmission over network 170 to the other node. The virtual switch 225 within the hypervisor 220 on the other node then forwards the request to the CVM 300 on that node for further processing.

Figure 3:
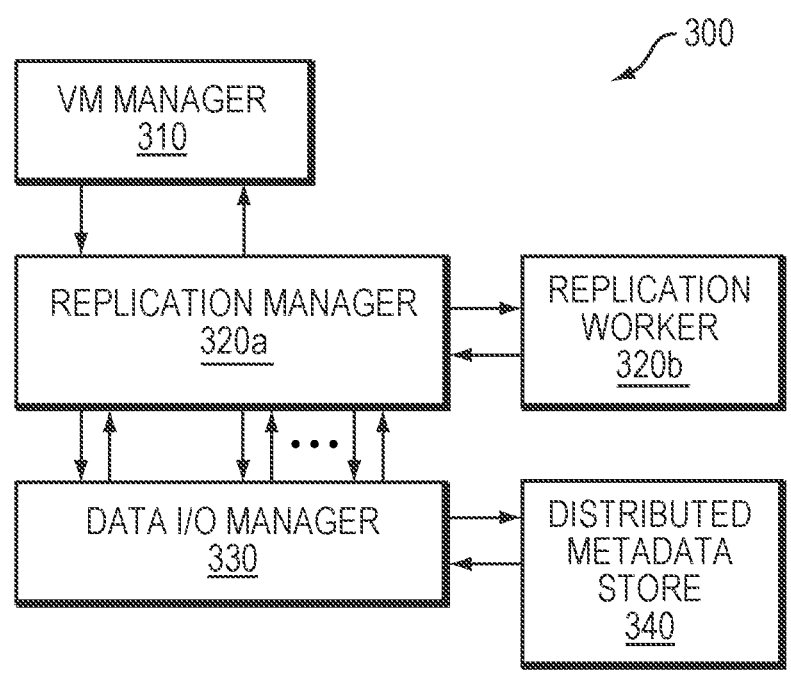
FIG. 3 is a block diagram of a controller virtual machine of the virtualization architecture.

FIG. 3 is a block diagram of the controller virtual machine (CVM) 300 of the virtualization architecture 200. In one or more embodiments, the CVM 300 runs an operating system (e.g., the Acropolis operating system) that is a variant of the Linux® operating system, although other operating systems may also be used in accordance with the embodiments described herein. The CVM 300 functions as a distributed storage controller to manage storage and I/O activities within DSF 250 of the cluster 100. Illustratively, the CVM 300 runs as a virtual machine above the hypervisor 220 on each node and cooperates with other CVMs in the cluster to form the distributed system that manages the storage resources of the cluster, including the local storage 162, the networked storage 168, and the cloud storage 166. Since the CVMs run as virtual machines above the hypervisors and, thus, can be used in conjunction with any hypervisor from any virtualization vendor, the virtualization architecture 200 can be used and implemented within any virtual machine architecture, allowing the CVM to be hypervisor agnostic. The CVM 300 may therefore be used in a variety of different operating environments due to the broad interoperability of the industry standard IP-based storage protocols (e.g., iSCSI, CIFS, and NFS) supported by the CVM.

Illustratively, the CVM 300 includes a plurality of processes embodied as a storage stack running in a user space of the operating system of the CVM to provide storage and I/O management services within DSF 250. The processes include a virtual machine (VM) manager 310 configured to manage creation, deletion, addition and removal of virtual machines (such as UVMs 210) on a node 110 of the cluster 100. For example, if a UVM fails or crashes, the VM manager 310 may spawn another UVM 210 on the node. A replication manager 320*a* is configured to provide replication and disaster recovery capabilities of DSF 250. Such capabilities include migration/failover of virtual machines and containers, as well as scheduling of snapshots. In an embodiment, the replication manager 320*a* may interact with one or more replication workers 320*b*. A data I/O manager 330 is responsible for all data management and I/O operations in DSF 250 and provides a main interface to/from the hypervisor 220. e.g., via the IP-based storage protocols. Illustratively, the data I/O manager 330 presents a vdisk 235 to the UVM 210 in order to service I/O access requests by the UVM to the DFS. A distributed metadata store 340 stores and manages all metadata in the node/cluster, including metadata structures that store metadata used to locate (map) the actual content of vdisks on the storage devices of the cluster.

Figure 4:
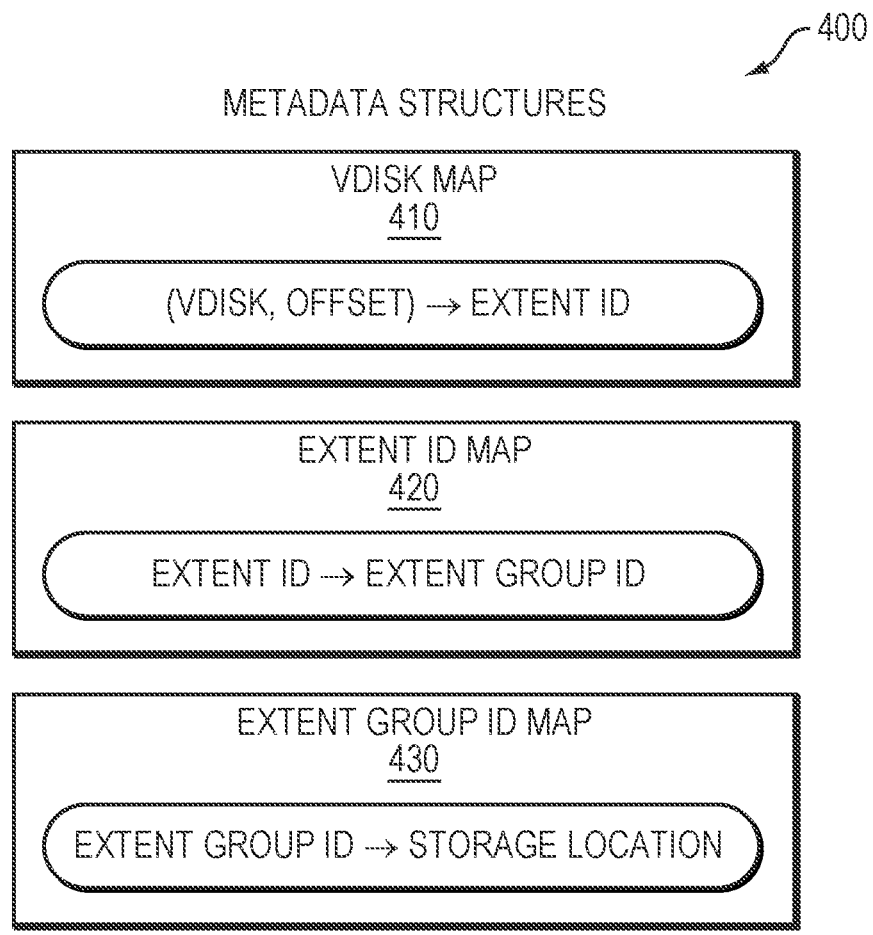
FIG. 4 is a block diagram of metadata structures used to map virtual disks (vdisks) of the virtualization architecture.

FIG. 4 is a block diagram of metadata structures 400 used to map virtual disks of the virtualization architecture. Each vdisk 235 corresponds to a virtual address space for storage exposed as a disk to the UVMs 210. Illustratively, the address space is divided into equal sized units called virtual blocks (vblocks). A vblock is a chunk of pre-determined storage, e.g., 1 MB, corresponding to a virtual address space of the vdisk that is used as the basis of metadata block map structures described herein. The data in each vblock is physically stored on a storage device in units called extents. Extents may be written/read/modified on a sub-extent basis (called a slice) for granularity and efficiency. A plurality of extents may be grouped together in a unit called an extent group. Each extent and extent group may be assigned a unique identifier (ID), referred to as an extent ID and extent group ID, respectively. An extent group is a unit of physical allocation that is stored as a file on the storage devices.

Illustratively, a first metadata structure embodied as a vdisk map 410 is used to logically map the vdisk address space for stored extents. Given a specified vdisk and offset, the logical vdisk map 410 may be used to identify a corresponding extent (represented by extent ID). A second metadata structure embodied as an extent ID map 420 is used to logically map an extent to an extent group. Given a specified extent ID, the logical extent ID map 420 may be used to identify a corresponding extent group containing the extent. A third metadata structure embodied as an extent group ID map 430 is used to map a specific physical storage location for the extent group. Given a specified extent group ID, the physical extent group ID map 430 may be used to identify information corresponding to the physical location of the extent group on the storage devices such as, for example, (1) an identifier of a storage device that stores the extent group, (2) a list of extent IDs corresponding to extents in that extent group, and (3) information about the extents, such as reference counts, checksums, and offset locations.

Figure 5:
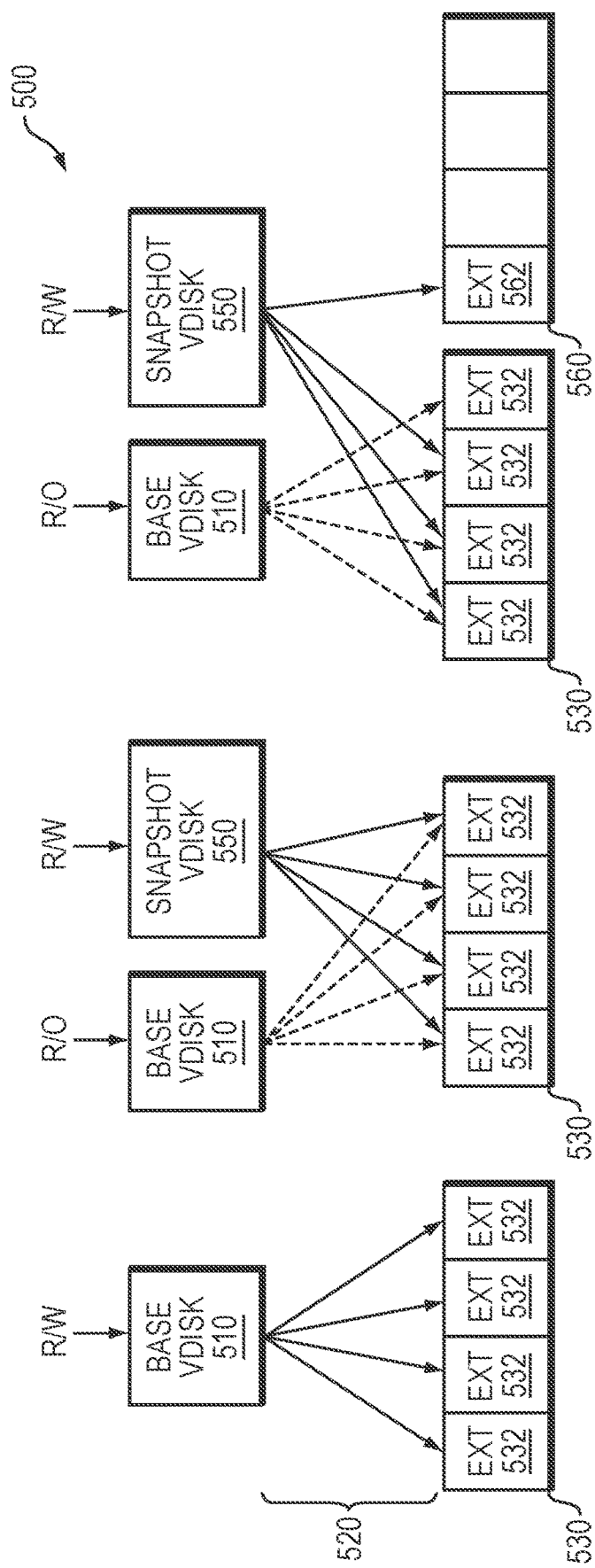
FIGS. 5A-5C are block diagrams of an exemplary mechanism used to create a snapshot of a vdisk.

In an embodiment, CVM 300 and DSF 250 cooperate to provide support for snapshots, which are point-in-time copies of storage objects, such as files, LUNs and/or vdisks. FIGS. 5A-5C are block diagrams of an exemplary mechanism 500 used to create a snapshot of a virtual disk. Illustratively, the snapshot may be created by leveraging an efficient low overhead snapshot mechanism, such as the redirect-on-write algorithm. As shown in FIG. 5A, the vdisk (base vdisk 510) is originally marked read/write (R/W) and has an associated block map 520, i.e., a metadata mapping with pointers that reference (point to) the extents 532 of an extent group 530 storing data of the vdisk on storage devices of DSF 250. Advantageously, associating a block map with a vdisk obviates traversal of a snapshot chain, as well as corresponding overhead (e.g., read latency) and performance impact.

To create the snapshot (FIG. 5B), another vdisk (snapshot vdisk 550) is created by sharing the block map 520 with the base vdisk 510. This feature of the low overhead snapshot mechanism enables creation of the snapshot vdisk 550 without the need to immediately copy the contents of the base vdisk 510. Notably, the snapshot mechanism uses redirect-on-write such that, from the UVM perspective. I/O accesses to the vdisk are redirected to the snapshot vdisk 550 which now becomes the (live) vdisk and the base vdisk 510 becomes the point-in-time copy, i.e., an "immutable snapshot," of the vdisk data. The base vdisk 510 is then marked immutable, e.g., read-only (R/O), and the snapshot vdisk 550 is marked as mutable, e.g., read/write (R/W), to accommodate new writes and copying of data from the base vdisk to the snapshot vdisk. In an embodiment, the contents of the snapshot vdisk 550 may be populated at a later time using, e.g., a lazy copy procedure in which the contents of the base vdisk 510 are copied to the snapshot vdisk 550 over time. The lazy copy procedure may configure DSF 250 to wait until a period of light resource usage or activity to perform copying of existing data in the base vdisk. Note that each vdisk includes its own metadata structures 400 used to identify and locate extents owned by the vdisk.

Another procedure that may be employed to populate the snapshot vdisk 550 waits until there is a request to write (i.e., modify) data in the snapshot vdisk 550. Depending upon the type of requested write operation performed on the data, there may or may not be a need to perform copying of the existing data from the base vdisk 510 to the snapshot vdisk 550. For example, the requested write operation may completely or substantially overwrite the contents of a vblock in the snapshot vdisk 550 with new data. Since the existing data of the corresponding vblock in the base vdisk 510 will be overwritten, no copying of that existing data is needed and the new data may be written to the snapshot vdisk at an unoccupied location on the DSF storage (FIG. 5C). Here, the block map 520 of the snapshot vdisk 550 directly references a new extent 562 of a new extent group 560 storing the new data on storage devices of DSF 250. However, if the requested write operation only overwrites a small portion of the existing data in the base vdisk 510, the contents of the corresponding vblock in the base vdisk may be copied to the snapshot vdisk 550 and the new data of the write operation may be written to the snapshot vdisk to modify that portion of the copied vblock. A combination of these procedures may be employed to populate the data content of the snapshot vdisk.

Figure 6:
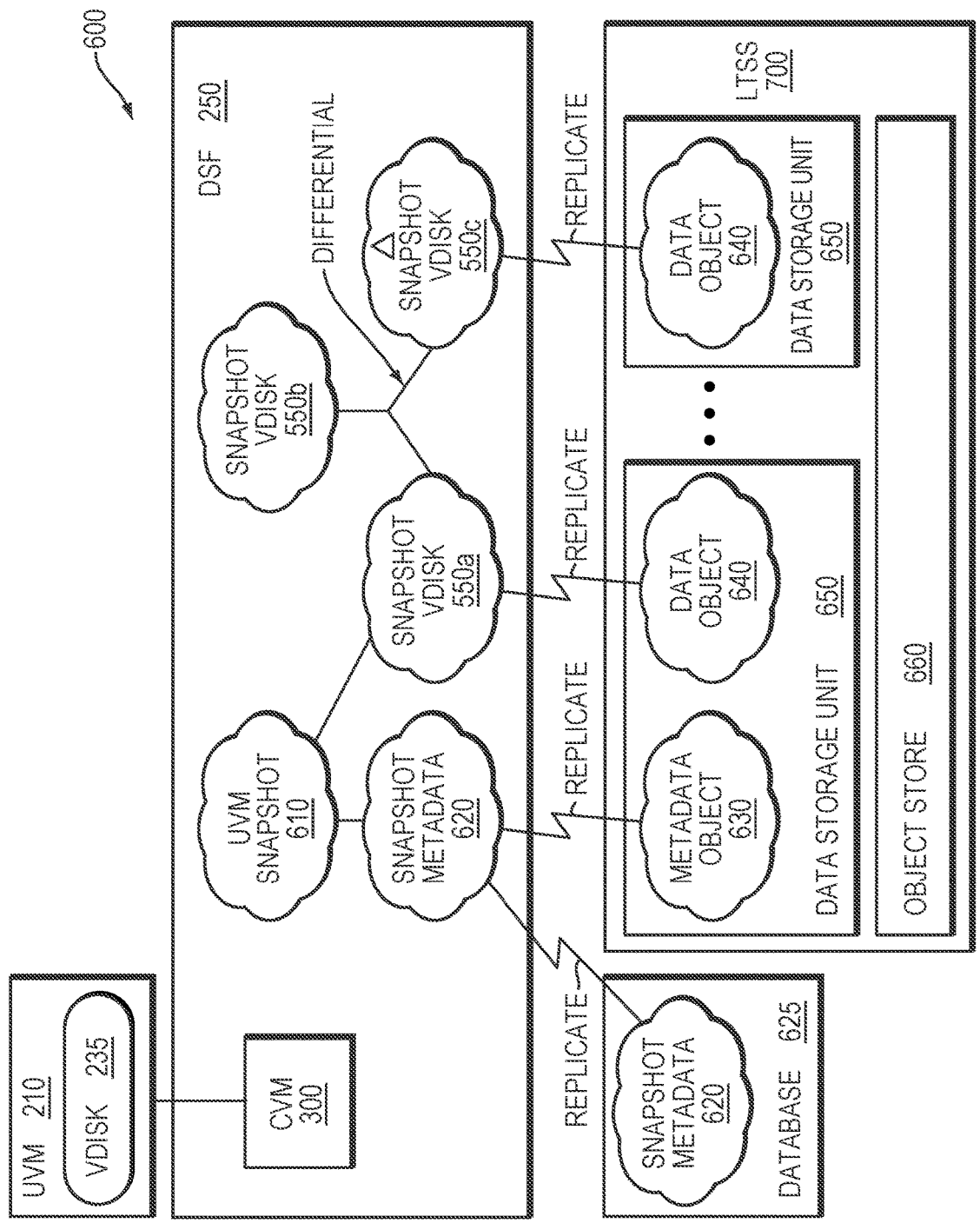
FIG. 6 is a block diagram of an exemplary data replication environment configured to replicate snapshots for storage to a long-term storage service (LTSS) of an archival storage system.

The embodiments described herein are directed to an indexing technique configured to provide an index data structure for efficient retrieval of data of a snapshot from the LTSS of the archival storage system. FIG. 6 is a block diagram of an exemplary data replication environment 600 configured to replicate snapshots for storage to the LTSS of the archival storage system. The architecture of LTSS 700 is configured to process large amounts of point-in-time images or recovery points (i.e., snapshots) of application workloads for storage on an object store 660 (archival storage vendor such as Amazon AWS S3 storage services, Google Cloud Storage, Microsoft Azure Cloud Storage and the like), wherein the workloads are characterized by a logical entity having typed data, e.g., a virtual machine (VM) such as a UVM 210. A client of LTSS 700 may be a distributed file system of a storage system (e.g., CVM 300 of DSF 250) that generates snapshots of the UVM (e.g., data processed by an application running in the UVM) and replicates the UVM snapshot 610 for storage in the object store 660. Replication, in this context, is directed to storage devices that exhibit incremental, block-level changes. LTSS 700 is thus a "generic" long-term storage service of an archival/backup storage system from the perspective of the client, i.e., the client flushes (delivers) data blocks of UVM snapshots 610 to the LTSS 700, which organizes the blocks for long-term storage in the object store 660. Each UVM snapshot 610 is generally handled as a data storage unit 650 by LTSS 700.

Illustratively, the content of each UVM snapshot 610 includes snapshot metadata and snapshot data, wherein the snapshot metadata 620 is essentially configuration information describing the logical entity (e.g., UVM 210) in terms of, e.g., virtual processor, memory, network and storage device resources of the UVM. The snapshot metadata 620 of the UVM 210 is illustratively replicated for storage in a query-able database 625 although, in an embodiment, the snapshot metadata 620 may be further replicated and organized as a metadata object 630 within a configuration namespace (e.g., bucket) of the object store 660 of LTSS 700 for long-term durability and availability. The data of the UVM 210 is virtualized as a disk (e.g., vdisk 235) and, upon generation of a snapshot, is processed as snapshot vdisk 550 of the UVM 210. The snapshot vdisk 550 is replicated, organized and arranged as one or more data objects 640 of the data storage unit 650 for storage in the object store 660. Each extent 532 of the snapshot vdisk 550 is a contiguous range of address space of a data object 640, wherein data blocks of the extents are "packed" into the data object 640 and accessible by, e.g., offsets and lengths. Note that a preferred size (e.g., 16 MB) of each data object 640 may be specified by the object store/vendor (e.g., AWS S3 cloud storage) for optimal use of the object store/vendor.

Operationally, the client initially generates a full snapshot of vdisk 235 (e.g., snapshot vdisk 550*a*) and transmits copies (i.e., replicas) of its data blocks to effectively replicate the snapshot vdisk 550*a* to LTSS 700. The snapshot vdisk 550*a* is thereafter used as a reference snapshot for comparison with one or more subsequent snapshots of the vdisk 235 (e.g., snapshot vdisk 550*b*) when computing incremental differences (deltas Δs). The client (e.g., CVM 300) generates the subsequent vdisk snapshots 550*b* at predetermined (periodic) time intervals and computes the deltas of these periodically generated snapshots with respect to the reference snapshot. The CVM 300 transmits replicas of data blocks of these deltas as Δ snapshot vdisk 550*c* to LTSS. From the perspective of the CVM 300, the LTSS 700 is a storage entity having an address on the network 170 (or WAN), similar to any networked storage 168. However, unlike networked storage 168, which is generally exposed to (accessed by) the CVM 300 using filesystem protocols such as NFS, CIFS and iSCSI, the LTSS 700 is accessed using specialized application program interfaces (APIs) referred to herein as replication APIs, which have rich descriptive semantics. For example, a replication API may specify the snapshotted vdisk 550*a* of the logical entity (e.g., UVM 210) as well as information describing the snapshot metadata 620 and snapshot vdisk 550*a* of the entity. The CVM 300 then transmits (replicates) a stream of data blocks of the snapshotted vdisk 550*a* to LTSS 700.

Figure 7:
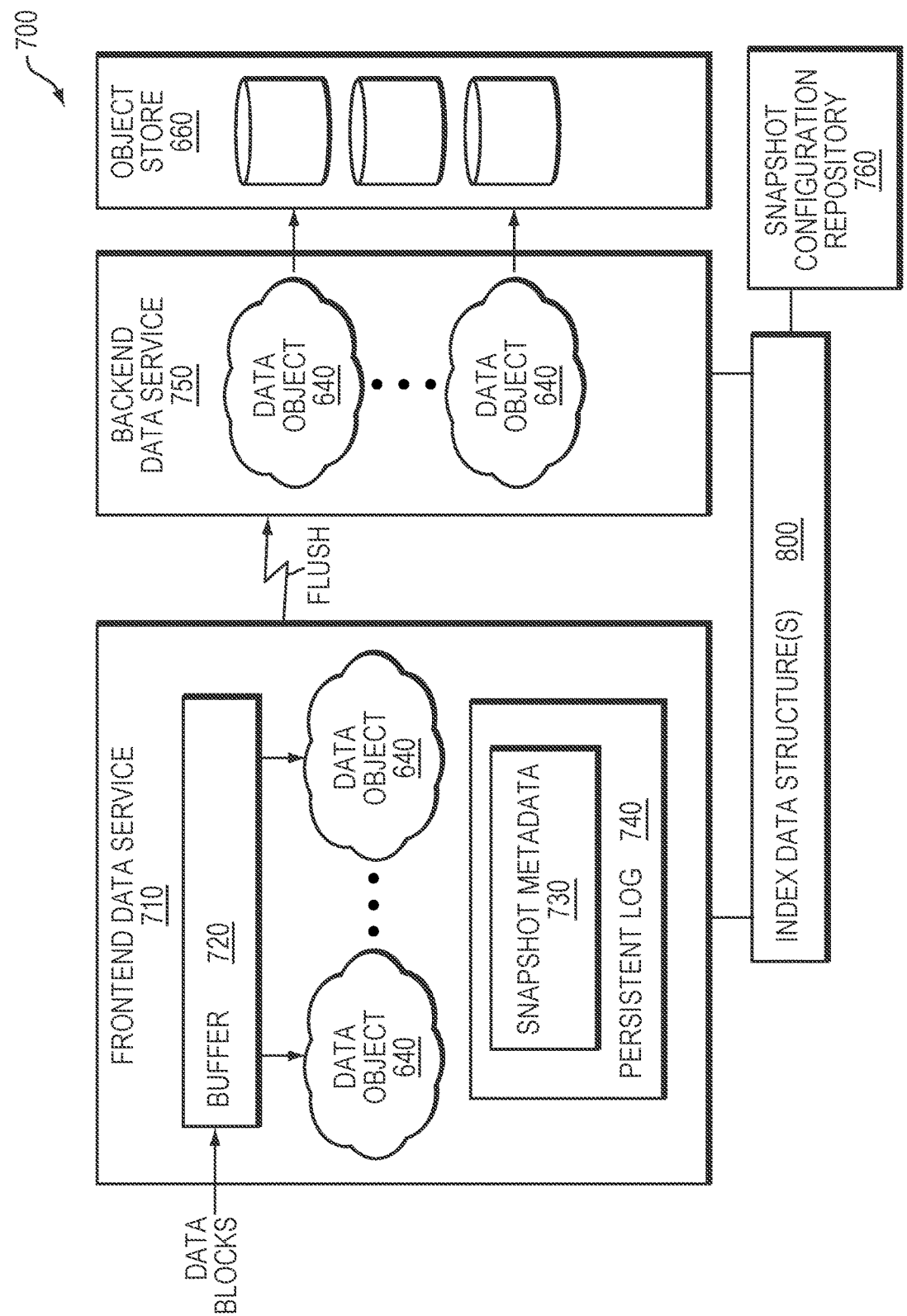
FIG. 7 is a block diagram of the LTSS of the archival storage system.

FIG. 7 is a block diagram of the LTSS 700 of the archival storage system. Illustratively, the LTSS 700 includes two data services (processes): a frontend data service 710 that cooperates with the client (e.g., CVM 300) to organize large amounts of the replicated snapshot data (data blocks) into data objects 640 and a backend data service 750 that provides an interface for storing the data objects 640 in the object store 660. In an embodiment, the LTSS data services/processes may execute on a computing platform at any location and is generally "stateless" as all data/metadata are stored on the object store 660. Accordingly, the frontend data service 710 and backend data service 750 may run either locally on a node of an "on-prem" cluster or remotely on a node of an "in-cloud" cluster. In response to receiving an initial replication API directed to the snapshot vdisk 550*a*, the frontend data service 710 temporarily stores the stream of data blocks of the snapshot vdisk 550*a*, e.g., in a buffer 720 and writes the data blocks into one or more extents (i.e., contiguous, non-overlapping, variable-length regions of the vdisk) for storage in data objects 640 of a preferred size (e.g., 16 MB) as specified by the object store vendor for optimal use. The frontend data service 710 then forwards (flushes) the data objects 640 to the backend data service 750 for storage in the object store 660 (e.g., AWS S3). In response to receiving a subsequent replication API directed to the Δ snapshot vdisk 550*c*, the frontend data service temporarily stores the stream of data blocks of the Δ snapshot vdisk 550*c* in buffer 720, writes those data blocks to one or more data objects 640, and flushes the objects to the backend data service 750.

Prior to flushing the data objects 640 to the backend data service 750, the frontend data service 710 creates metadata that keeps track of the amount of data blocks received from the CVM 300 for each replicated snapshot, e.g., snapshot vdisk 550*a* as well as Δ snapshot vdisk 550*c*. The metadata associated with the snapshot (i.e., snapshot metadata 730) is recorded as an entry in persistent storage media (e.g., a persistent log 740) local to the frontend data service 710. The snapshot metadata 730 includes information describing the snapshot data, e.g., a logical offset range of the snapshot vdisk 550. In an embodiment, the snapshot metadata 730 is stored as an entry of the persistent log 740 in a format such as, e.g., snapshot ID, logical offset range of snapshot data, logical offset into the data object to support storing multiple extents into a data object, and data object ID. The frontend data service 710 updates the snapshot metadata 730 of the log entry for each data object 640 flushed to the backend data service 750. Notably, the snapshot metadata 730 is used to construct the index data structure 800 of LTSS.

Illustratively, the index data structure 800 is configured to enable efficient identification (location) and retrieval of data blocks contained within numerous data objects 640 (snapshots) stored on the object store 660. Effectively, the index data structure acts as an independent database organized to retrieve data by extent of a vdisk (as recorded in the associated object store of the archival storage system) according to any snapshot. Notably, each snapshot is associated with a corresponding index data structure and may include incremental changes to a prior snapshot that may reference a prior index data structure associated with the prior snapshot. In this manner, only the incremental changes between snapshots need be stored in the archival storage system as indicated above, because later index data structures may reference (via prior index data structures) older blocks in prior snapshots.

Accordingly, the index data structure 800 may be extended to embody a plurality of "cloned," e.g., copy-on-write, index structures associated with many of the data objects 640 of LTSS 700 to enable the location and retrieval of the data blocks. To that end, a snapshot configuration repository 760 (e.g., database) is provided, e.g., on storage media local to the LTSS data services, that is dynamically query-able by the data services to select a snapshot (i.e., the repository is organized according to snapshot) and its corresponding index data structure 800 of a data object, e.g., from among the numerous (cloned) index data structures. The repository 760 may also be stored on the object store 660 to ensure fault tolerance, durability and availability.

In an embodiment, the snapshot configuration repository 760 is organized as a key-value store that provides a higher-level of indexing (i.e., higher than the actual index data structure) to resolve to a snapshot corresponding to a (cloned) index data structure used to retrieve one or more data blocks for data objects stored in the object store 660. The snapshot configuration repository 760 is managed separately from the object store (e.g., remote from the object store media) and points to roots of the cloned index structures associated with snapshot data objects (e.g., using a remote referencing 1*o* mechanism such as a URL to a root node of a cloned index structure resident on object store media located on the network/internet.) Such remote referencing enables essentially infinite storage capacity of the LTSS object store, e.g., among various cloud service providers (CSPs) such as AWS, Google, Azure and the like, that is not limited by an address space (file space, namespace) of a (client) distributed file system. Note that the limited address space of such client file systems also limits the amount of "active" file system snapshots that can be maintained on the client's storage (such as a volume).

In an embodiment, the snapshot configuration repository 760 may be used as a search engine to enable efficient locating and retrieving of a data block from the selected object. Similar to the persistent log 740, the snapshot configuration repository 760 includes configuration information about each snapshot and associated data object as well as pointers to the roots of the index data structures for the data objects. The repository 760 may also be indexed by time stamp or VM/vdisk name of a snapshot. The snapshot may then be selected and a pointer to a root node of the corresponding index data structure 800 may be identified to access a specified logical offset range of a snapshot. Notably, the index data structure 800 is configured to translate the logical offset range (address space) of data in the snapshot to the data object address space of the object store hosting the snapshot data to thereby enable efficient (i.e., bounded time) retrieval of the snapshot data from the object store independent of the number of snapshots.

Figure 8:
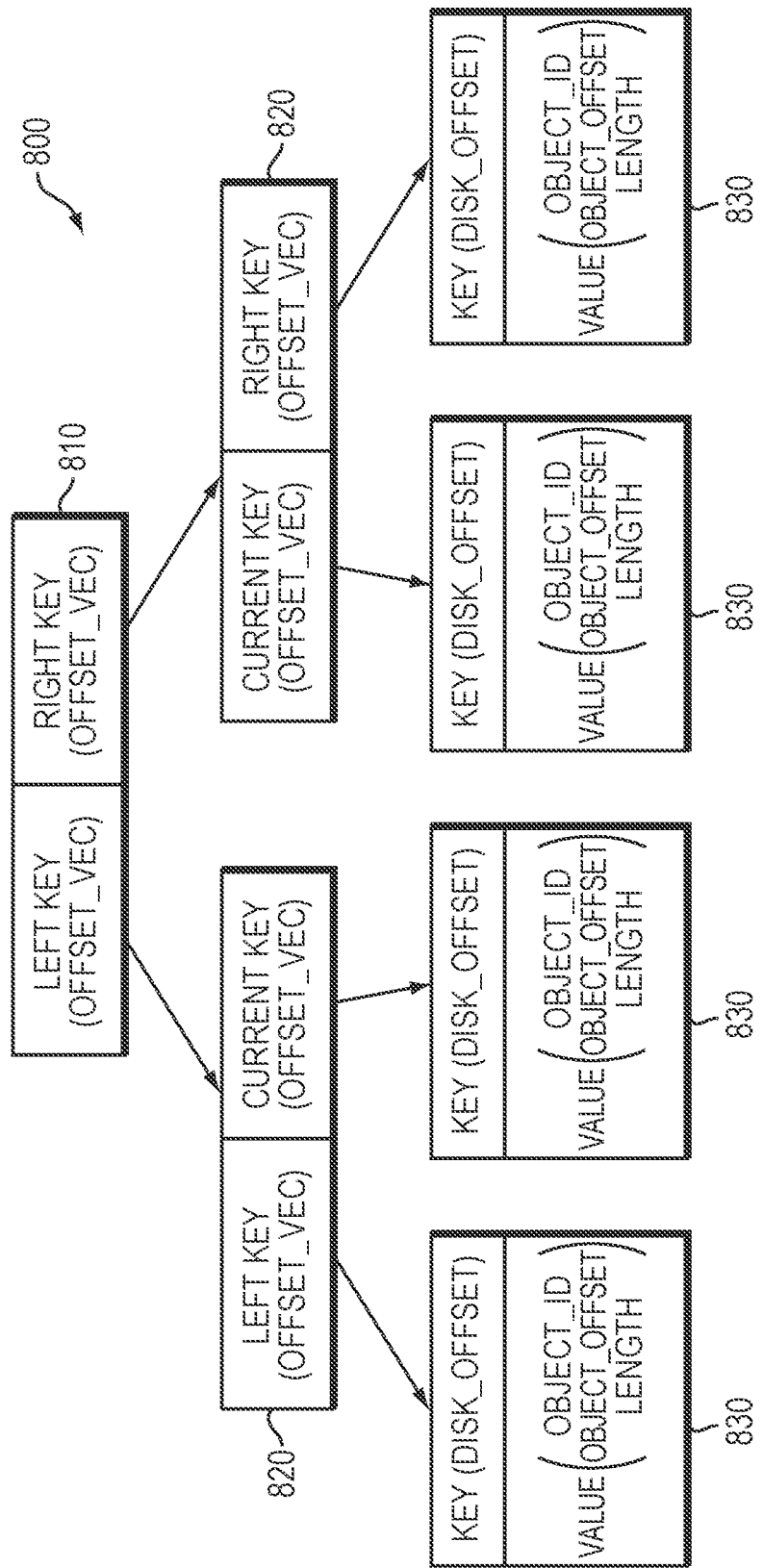
FIG. 8 is a block diagram illustrating an index data structure configured for efficient retrieval of snapshots from the LTSS of the archival storage system.

FIG. 8 is a block diagram illustrating the index data structure 800 configured for efficient retrieval of snapshots from the LTSS of the archival storage system. In one or more embodiments, the index data structure 800 is illustratively a balanced tree (e.g., a B+ tree) with a large branching factor for internal nodes to maintain a limited depth of the tree, although other types of data structures, such as heaps and hashes, may be used with the embodiments described herein. When embodied as the B+ tree, the index data structure includes a root node 810, one or more intermediate (internal) nodes 820 and a plurality of leaf nodes 830. For the reference snapshot vdisk 550a, each internal node 820 contains a set of keys that specify logical offset ranges into the address space of the vdisk 550a and corresponding values that reference other nodes in the B+ tree (e.g., lower level internal nodes or leaf nodes). Each leaf node 830 contains a value describing (pointing to) a data object having the extent that includes the selected data blocks corresponding to the specified logical offset range as well as a logical offset of the extent in the data object and length of the extent. In other words, a leaf node can be considered as a 4-tuple having: (i) a logical offset in the address space of the logical entity (e.g., snapshot), (ii) a data object id, (iii) a logical offset of the extent into the data object, and (iv) a length of the extent. The technique only requires traversing the depth of a (cloned) index data structure to find the leaf node 830 pointing to a selected data block of a particular snapshot (data object). Notably, a large branching factor (e.g., 1024) for internal nodes permits a very large number of references in the internal nodes 820 of the B+ tree so that a depth of the tree is reduced (e.g., to 2 or 3 levels) enabling an effective bounded traversal time from the root node to a leaf node (e.g., traverse at most 3 nodes to locate data in the object store). The address space covered by the leaf nodes is of variable length and depends upon a number of extents referenced according to the branching factor. In an embodiment, the internal nodes have a branching factor much larger than the leaf nodes to support a very large address space (e.g., given an extent size of less than 1 MB and a branching factor of 32K, a two-level B-tree can reference an address space as great as 16 exabytes).

In an embodiment, each internal node 820 contains keys and pointers to children nodes, and generally not any values. The root node 810 is a variant of the internal node 820 but, similar to the internal node, contains disk offsets as keys. For each key, a left pointer points to data of the vdisk ranging from a left key to (and including) a current key; illustratively, data in a "child" internal node 820 for the left pointer embodies the form [left key, current key]. A right pointer points to data of the vdisk ranging from the current key to (but excluding) a right key; illustratively, data in a child internal node for the right pointer embodies the form [current key, right key]. The fields of the internal node illustratively include (i) Offset_Vec containing a list of offsets in the vdisk that function as a key; and (ii) Child_Pointer_Vec containing a pointer to a child node. The leaf node 830 contains a predetermined number of descriptors (e.g., up to 1024), each of which describes the vdisk address space covered by the descriptor and the location of the corresponding data in the form of the following keys and values:

Key (Disk_Offset)→Value (Object_ID, Object_Logical_Offset, Length)

wherein Disk_Offset refers to the offset within the vdisk; Object_ID identifies the data object in the archival storage system and may be a combination of a vdisk uuid and an assigned predefined (int64) number; Object_Logical_Offset is the logical offset with the object (specified by Object_ID) at which the data resides; and Length is the number of contiguous bytes (size of the extent) beginning at "Offset" (Disk_Offset) that is pointed to by the key entry.

Referring to FIG. 6, assume the CVM 300 generates the reference snapshot as snapshot vdisk 550a for vdisk 235 and having a size of 1 TB with an assigned a vdisk ID of, e.g., 1. The CVM 300 replicates the data blocks of the snapshot vdisk 550a to the LTSS 700 in accordance with a first replication API call that identifies the vdisk ID 1 and the snapshot vdisk 550a as, e.g., snapshot ID 1. In response to receiving the first replication API call, the frontend data service 710 "buffers" the changed data blocks to an optimal size (e.g., 16 MB) and writes the blocks into a plurality of ("n") data objects 640 assigned, e.g., data object IDs 1-n. The frontend data service 710 also records snapshot metadata 730 describing the written data blocks (e.g., vdisk ID 1, snapshot ID 1, logical offset range 0-1 TB, data object IDs 1a-n) to the persistent log 740. After all of the data blocks are replicated and flushed to the object store 660, the frontend data service 710 constructs one or more index data structures 800 for the snapshot vdisk 550a (i.e., a parent B+ tree) using the appropriate snapshot metadata 730 for snapshot ID 1.

Assume that at the predetermined time interval, the CVM 300 generates a subsequent snapshot for the vdisk 235 (e.g., snapshot vdisk 550b) and after specifying snapshot 550a as a reference snapshot and performing the incremental computation, determines that the deltas (changes) of data blocks between the snapshot vdisks 550a,b lie in the offset range of 1 MB-5 MB and 1 GB-2 GB of the reference snapshot (e.g., snapshot vdisk 550a). Such deltas may be determined for a series of snapshots. For example, the CVM 300 may issue a second replication API call to the LTSS 700 that identifies the vdisk ID 1, a first snapshot vdisk 550b as, e.g., snapshot ID 2, and the logical offset range of 1 MB-5 MB for the changed data blocks. The CVM 300 then replicates the delta data blocks to the LTSS 700. In response to receiving the first replication API call, the frontend data service 710 buffers the changed data blocks to an optimal size (e.g., 16 MB) and writes the blocks into a data object 640 assigned, e.g., an object ID 2. The frontend data service 710 also records snapshot metadata 730 describing the written data blocks (e.g., vdisk ID 1, snapshot ID 2, logical offset range 1 MB-5 MB, object ID 2) to the persistent log 740.

After all of the changed data blocks are replicated and flushed to the object store 660, the frontend data service 710 constructs an index data structure 800 for the first snapshot vdisk 550b using the appropriate snapshot metadata 730 for snapshot ID 2. Assume the changed data blocks at the logical offset range 1 MB-5 MB of the snapshot vdisk 550a fit within the data object (extent) referenced by a leaf node 830 of the parent B+ tree. A new, updated copy of the leaf node may be created to reflect the changed data blocks at the logical offset range while the remaining leaf nodes of the parent B+ tree remain undisturbed. Updated copies of the internal node(s) 820 referencing the logical offset range of the changed data blocks described by the updated leaf node may likewise be created. A new "cloned" B+ tree is thus constructed based on the parent B+ tree using a copy-on-write technique. The cloned B+ tree has a new root node 810a and internal nodes 820 that point partially to "old" leaf nodes 830 of the parent B+ tree as well as to the new leaf node 830a (not shown). Illustratively, the leaf node 830a is copied and then modified to reference the changed data. Effectively, the cloned B+ tree for the first A snapshot vdisk 550c is a "first child" B+ tree that shares internal and leaf nodes with the parent B+ tree.

The CVM 300 thereafter issues a third replication API call to the LTSS 700 that identifies the vdisk ID 1, a second A snapshot vdisk 550c as, e.g., snapshot ID 3, and the logical offset range of 1 GB-2 GB for the changed data blocks. The CVM 300 replicates the delta data blocks to the LTSS 700. In response to receiving the third replication API call, the frontend data service 710 buffers the changed data blocks to an optimal size (e.g., 16 MB) and writes the blocks into "n" data objects 640 assigned, e.g., object IDs 3a-n (not shown). The frontend data service 710 records snapshot metadata 730 describing the written data blocks (e.g., vdisk ID 1, snapshot ID 3, logical offset range 1 GB-2 GB, object IDs 3a-n) to the persistent log 740. After all of the changed data blocks are replicated and flushed to the object store 660, the frontend data service 710 constructs one or more second child B+ trees for the second A snapshot vdisk, as described above. Notably, a large branch factor of the B+ tree permits a very large number of references in the internal nodes of the B+ tree to support a correspondingly large number of changes between snapshots so that the index structure depth of the tree may be maintained at a maximum depth (e.g., 2 to 3 levels) enabling rapid traversal time from the root node to a leaf node. That is, no matter how many snapshots exist, references to the oldest data remain referenced by the newest snapshot resulting in a fixed number of node traversals to locate any data.

Operationally, retrieval of data blocks (snapshot data) by the LTSS data services from any snapshot stored in the archival storage system involves fetching the root of the index (B+ tree) data structure 800 associated with the snapshot from the snapshot configuration repository 760, using the offset/range as a key to traverse the tree to the appropriate leaf node 830, which points to the location of the data blocks in the data object 640 of the object store 660. For incremental restoration of snapshot data, the technique further enables efficient computation of differences (deltas) between any two snapshots. In an embodiment, the LTSS data services perform the delta computations by accessing the snapshot configuration repository 760, identifying the root nodes 810 of the corresponding index data structures 800 (e.g., B+ trees) for the two snapshots, and traversing their internal nodes 820 all the way to the leaf nodes 830 of the index data structures to determine any commonality/overlap of values. All leaf nodes 830 that are common to the B+ trees are eliminated, leaving the non-intersecting leaf nodes corresponding to the snapshots. According to the technique, the leaf nodes of each tree are traversed to obtain a set of <logical offset, object ID, object offset> tuples and these tuples are compared to identify the different (delta) logical offset ranges between the two snapshots. These deltas are then accessed from the data objects and provided to a requesting client.

Previous deployments of index data structures employing B+ trees are generally directed to primary I/O streams associated with snapshots/clones of active file systems having changeable (mutable) data. In contrast, the technique described herein deploys the B+ tree as an index data structure 800 that cooperates with LTSS 700 for long-term storage of large quantities of typed snapshot data treated as immutable and, further, optimizes the construction of the B+ tree to provide efficiencies with respect to retrieval of data blocks contained in large quantities of long-term storage data objects 640. For example, the technique imposes transactional guarantees associated with a client-server model to facilitate construction of the index data structure 800 in local storage of LTSS 700 prior to transmission (flushing) to the object store 660. Upon initiation of a transaction to replicate snapshot data (e.g., snapshot vdisk 550a or A snapshot vdisk 550c), a client (e.g., CVM 300) may issue a start replication command that instructs a server (e.g., frontend data service 710 of LTSS 700) to organize the data as extents for storage into one or more data objects 640. Data blocks of the object 640 are flushed to the backend data service 750 for storage on the object store 660. Subsequently, the CVM 300 may issue a complete replication command to the frontend data service 710 which, in response, finalizes the snapshot by using information from snapshot metadata 730 to construct the index data structure 800 associated with the data object locally, e.g., in a fast storage tier of LTSS 700 and, in one or more embodiments, flushing the constructed index structure 800 to the backend data service for storage on the object store 660. Note that the transactional guarantees provided by the optimized technique allow termination of the replication and, accordingly, termination of construction of the index data structure prior to finalization.

In essence, the technique optimizes the use of an index data structure (e.g., B+ tree) for referencing data recorded in a transactional archival storage system (e.g., LTSS) that has frontend and backend data services configured to provide transactional guarantees that ensures finalization of snapshot replication only after the client (e.g., CVM) indicates completion of the transaction. Until issuance of the completion command, the replication (or backup) transaction can be terminated. This enables construction of a (cloned) index data structure for each replicated snapshot on high performance (fast) storage media of an LTSS storage tier that may be different from the storage media tier used for long-term storage of the index data structure 800 and data object 640. Note that active file system deployments of the B+ tree as an index data structure are constrained from applying such a transactional model to write operations (writes) issued by a client (e.g., user application) because those writes are immediately applied to the active file system (e.g., as "live" data) to support immediate access to the data and preserved in the B+ tree index structure unconditionally (i.e., writes in the index structure cannot be ignored or terminated as in transactional models). Moreover, conventional backup systems associated with active file systems also require that the writes of the snapshot data be immediately available for retrieval without delay to support immediate availability of restore operations. In contrast, the LTSS architecture is optimized for storing immutable typed snapshot data not shared with an active (mutable) file system and not live data for active file systems or conventional backup systems.

In other words after the replication complete command, the metadata associated with the stream of snapshot data is processed to construct the index data structure (e.g., a B+ tree) at the frontend data service 710 and flushed to the backend data service 750 for storage in the object store 660. This optimization is advantageous because object stores are generally immutable repositories consisting of low-performance (slow) storage media that are not generally suited for constructing changing and frequently accessed data structures that require constant iteration and modification (mutation) during construction. The technique thus enables construction of the B+ tree index structure locally on a fast storage media tier of the LTSS 700 before flushing the completed index data structure 800 to the object store 660. The fast, local storage media used to persistently store the metadata and construct the index data structure may be SSD or HDD storage devices that are separate and apart from the storage devices used by the object store 660.

The LTSS 700 is thus agnostic as to the file system (client) delivering the data and its organization, as well as to the object store storing the data. By implementing a transactional model for data replication by the data services of LTSS 700, the technique further enables deferred construction of a (cloned) index data structure 800 locally on fast storage media (e.g., on-prem) upon transaction completion (e.g., a backup commit command), and subsequent flushing of a completed index data structure to the remote object store 660 of LTSS (e.g., in-cloud). Deferral of construction of the index data structure enables fast intake (i.e., reception) of the replicated snapshot data in a log-structured (e.g., sequential order) format while the snapshot metadata is recorded in the persistent log by the frontend data service. The data services of LTSS 700 perform optimal organization and packing of the data as extents into data objects 640 as defined by the object store vendor/CSP. Notably, the technique described herein facilitates efficient storage and retrieval of the data objects using an indexing data structure 800 that optimized to accommodate very large quantities of snapshots (e.g., many thousand over a period of years), while managing metadata overhead that grows linearly with the increase of data changes and not with the number of snapshots.

For pure archival storage, a log-structured approach may be preferred because primarily writes (only occasionally reads) are performed to storage. Yet for archival storage where data is frequently retrieved, e.g., for compliance purposes in medical and SEC regulation deployments, a B+ tree structure may be preferred. This latter approach is particularly attractive when the B+ tree is optimized to handle frequent "read-heavy" and "write-heavy" workloads. As described herein, the technique balances the trade-off such that the cost of creating the index structure is realized later, i.e., not in the context of incoming I/O writes, by deferring work from the critical path/time so as to avoid adding latency that typically occurs creating pure B+ tree structures. Therefore, the technique also provides an efficient indexing arrangement that leverages a write-heavy feature of the log-structured format to increase write throughput to the LTSS 700 for snapshot data replication to the object store 660 with a read-heavy feature of the index (e.g., B+ tree) data structure 800 to improve read latency (i.e., bounded time to locate data independent of the number of snapshots) by the LTSS 700 for snapshot data retrieval from the object store 660.

Illustratively, the indexing technique is optimized to support extended-length block chains of snapshots (i.e., "infinite-depth" snapshot chains) for long-term storage in the object store of the archival storage system. A problem with such deep snapshot chains is that a typical search for a selected data block of a snapshot requires traversing 1*o* the entire snapshot chain until the block is located. The indexing technique obviates such snapshot chain traversal by providing an index data structure 800 (e.g., B+ tree) that is cloned for each snapshot (e.g., snapshot disk 550*a,b*) of a logical entity (e.g., vdisk 235) using copy-on-write that enables sharing references to data blocks with other cloned index data structures, as described herein. As also noted, the technique only requires traversing the depth of a (cloned) index data structure to find the leaf node pointing to a selected data block of a particular snapshot.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   replicating data of a first snapshot of a logical entity in a first transaction from a client to a data service of a transactional archival storage system, the first snapshot generated by a file system of the client executing on a computer node and addressable by the client using a first address space;
   constructing a first index data structure at the data service upon finalization of the first snapshot data replication and after a receiving a first command from the client indicating completion of the first transaction by the client, the first index data structure mapping the first address space of the first snapshot to a second address space of an object store addressable by the client for storing and retrieving data objects based on metadata recorded at the data service;
   determining data changes between the first snapshot and a second snapshot of the logical entity at the file system;
   replicating the data changes in a second transaction from the client to the data service; and
   constructing a second index data structure at the data service upon finalization of the data change replication and after receiving a second command from the client indicating completion of the second transaction by the client by (i) referencing portions of the first index data structure having unchanged data between the first snapshot and the second snapshot and (ii) modifying portions of the first index structure having the changed data, wherein the index data structures are stored in a repository according to snapshot to support immediate access request.

2. The method of claim 1, wherein a maximum index structure depth of the first index structure is maintained to locate any of the data by controlling a branch factor for internal nodes of the first index data structure.

3. The method of claim 2, wherein a size of the first address space covered by each leaf node of the index data structures depends upon a number of extents referenced according to the branch factor.

4. The method of claim 1, wherein the logical entity is organized as extents written to the data objects according to a preferred size of the data objects for the object store.

5. The method of claim 1, wherein internal nodes of the index data structures include keys as a list of offsets in the first address space, wherein each key is associated with a corresponding reference to a child node.

6. The method of claim 1, wherein a first leaf node of the first index structure identifies a first data object of the object store having the data of the first snapshot, and wherein a second leaf node of the second index structure identifies a second data object of the object store having the changed data.

7. The method of claim 6, wherein the data changes are stored in the second data object in the object store different from that of the first data object.

8. The method of claim 1, wherein leaf nodes of the index data structures include (i) identifiers of the data objects of the object store, (ii) logical offsets in the first address space for the first snapshot, and (iii) a logical offset into a data object that contains one or more extents.

9. The method of claim 1, wherein the repository is stored in the object store.

10. A non-transitory computer readable medium including program instructions for execution on a processor, the program instructions configured to:
   replicate data of a first snapshot of a virtual disk (vdisk) of a file system addressable in a first address space by a client in a first transaction to a data service of a transactional archival storage system;
   construct a first index data structure at the data service upon finalization of the first snapshot data replication and after receiving a first command from the client indicating completion of the first transaction by the client, the first index data structure mapping the first address space of the first snapshot to a second address space of the transactional archival storage system addressable by the client for storing and retrieving data objects based on metadata recorded in a persistent log at the data service;
   determine data changes between the first snapshot and a second snapshot of the vdisk at the file system;
   replicate the data changes in a second transaction from the client to the data service; and
   construct a second index data structure at the data service upon finalization of the data change replication and after receiving a second command from the client indicating completion of the second transaction by the client by (i) referencing portions of the first index data structure having unchanged data between the first snapshot and the second snapshot and (ii) copying and modifying portions of the first index structure having the changed data, wherein the index data structures are stored in a repository according to snapshot to support immediate access request.

11. The non-transitory computer readable medium of claim 10, wherein a maximum index structure depth of the first index structure is maintained to locate any of the data by controlling a branch factor for internal nodes of the first index data structure.

12. The non-transitory computer readable medium of claim 11, wherein a size of the first address space covered by each leaf node of the index data structures depends upon a number of extents referenced according to the branch factor.

13. The non-transitory computer readable medium of claim 10, wherein the vdisk is organized as extents written to the data objects according to a preferred size of the data objects for the transactional archival storage system.

14. The non-transitory computer readable medium of claim 10, wherein internal nodes of the index data structures include keys as a list of offsets in the first address space, wherein each key is associated with a corresponding reference to a child node.

15. The non-transitory computer readable medium of claim 10, wherein a first leaf node of the first index structure identifies a first data object of the transactional archival storage system having the data of the first snapshot, and wherein a second leaf node of the second index structure identifies a second data object of the transactional archival storage system having the changed data.

16. The non-transitory computer readable medium of claim 15, wherein the data changes are stored in the second data object in the transactional archival storage system different from that of the first data object.

17. The non-transitory computer readable medium of claim 10, wherein leaf nodes of the index data structures include (i) identifiers of the data objects of the transactional archival storage system, (ii) logical offsets in the first address space for the first snapshot, and (iii) a logical offset into a data object that contains one or more extents.

18. An apparatus comprising:
   a frontend data service and a backend data service executing on a node connected via a network to a transactional archival storage system, the node having a processor configured to execute program instructions to:
   transmit data of a first snapshot of a logical entity from the frontend data service to the backend data service for storage on the transactional archival storage system different from that of the data services, the data replicated to the frontend data service from a client in a first transaction;
   construct a first index data structure at the frontend data service upon finalization of the first snapshot data transmission and after receiving a first command from the client indicating completion of the first transaction, the first index data structure mapping a first address space addressable by the client for the first snapshot to a second address space of the transactional archival storage system addressable by the client for data objects based on metadata recorded at the frontend data service;
   determine data changes between the first snapshot and a second snapshot of the logical entity at the client;
   replicate the data changes in a second transaction from the client to the frontend data service for storage on the transactional archival storage system by the backend service; and
   construct a second index data structure at the frontend data service upon finalization of the data change replication and after receiving a second command from the client indicating completion of the second transaction by the client by (i) referencing portions of the first index data structure having unchanged data between the first snapshot and the second snapshot and (ii) modifying portions of the first index structure having the changed data, wherein the index data structures are stored in a repository according to snapshot to support immediate access request.

19. The apparatus of claim 18 wherein the transactional archival storage system comprises an object store.

20. The apparatus of claim 18, wherein a maximum index structure depth of the first index structure is maintained to locate any of the data by controlling a branch factor for internal nodes of the first index data structure.

21. The apparatus of claim 20, wherein a size of the first address space covered by each leaf node of the index data structures depends upon a number of extents referenced according to the branch factor.

22. The apparatus of claim 18, wherein the logical entity is organized as extents written to the data objects according to a preferred size of the data objects for the transactional archival storage system.

23. The apparatus of claim 18, wherein internal nodes of the index data structures include keys as a list of offsets in the first address space, wherein each key is associated with a corresponding reference to a child node.

24. The apparatus of claim 18, wherein a first leaf node of the first index structure identifies a first data object of the transactional archival storage system having the data of the first snapshot, and wherein a second leaf node of the second index structure identifies a second data object of the transactional archival storage system having the changed data.

25. The apparatus of claim 18, wherein the data changes are stored in the second data object in the transactional archival storage system different from that of the first data object.

26. The apparatus of claim 18, wherein leaf nodes of the index data structures include (i) identifiers of the data objects of the transactional archival storage system, (ii) logical offsets in the first address space for the first snapshot, and (iii) a logical offset into a data object that contains one or more extents.

27. The apparatus of claim 18, wherein the repository is stored in the transactional archival storage system.

* * * * *

UNITED STATES PATENT AND TRADEMARK OFFICE
CERTIFICATE OF CORRECTION

PATENT NO. : 12,417,205 B2
APPLICATION NO. : 17/487935
DATED : September 16, 2025
INVENTOR(S) : Abhishek Gupta et al.

Page 1 of 2

It is certified that error appears in the above-identified patent and that said Letters Patent is hereby corrected as shown below:

In the Specification

Column 3, Line 36:
compute and storage services for information, data and
Should read:
compute and storage services for information, i.e., data and Column 5, Line 29:
iSCSI. CIFS or NFS and is mounted as a virtual disk on the
Should read:
iSCSI, CIFS or NFS and is mounted as a virtual disk on the Column 5, Line 50:
between the hypervisor 220 and the CVM 30). This
Should read:
between the hypervisor 220 and the CVM 300. This Column 6, Line 51:
the hypervisor 220. e.g.,via the IP-based storage protocols.
Should read:
the hypervisor 220, e.g.,via the IP-based storage protocols Column 7, Line 51:
redirect-on-write such that, from the UVM perspective. I/O
Should read:
redirect-on-write such that, from the UVM perspective, I/O Column 10, Line 57:
remote referencing 1o mechanism such as a URL to a root Signed and Sealed this
Sixteenth Day of December, 2025

John A. Squires
*Director of the United States Patent and Trademark Office*

Should read:
remote referencing mechanism such as a URL to a root

Column 15, Line 35:
objects using an indexing data structure 800 that optimized
Should read:
objects using an indexing data structure 800 that is optimized Column 15, Line 67:
selected data block of a snapshot requires traversing 1o the
Should read:
selected data block of a snapshot requires traversing the